United States Patent [19]

Chappell

[11] Patent Number: 5,391,382
[45] Date of Patent: Feb. 21, 1995

[54] LOW DUST POWDERED CELLULOSE

[75] Inventor: Rulon A. Chappell, North St. Paul, Minn.

[73] Assignee: Qualcepts Nutrients, Inc., Minneapolis, Minn.

[21] Appl. No.: 189,431

[22] Filed: Jan. 31, 1994

[51] Int. Cl.6 .............................................. A23C 19/00
[52] U.S. Cl. ...................... 426/96; 426/285; 426/321; 426/334; 426/293; 426/294; 426/302
[58] Field of Search .................. 426/96, 285, 321, 334, 426/293, 294, 302

[56] References Cited

U.S. PATENT DOCUMENTS

| | | | |
|---|---|---|---|
| 4,380,459 | 4/1983 | Netting | 55/87 |
| 4,428,984 | 1/1984 | Shimizu et al. | 427/220 |
| 4,557,938 | 12/1985 | Sander et al. | |
| 4,603,110 | 7/1986 | Morehouse et al. | |
| 4,696,762 | 9/1987 | Sander et al. | |
| 4,699,669 | 10/1987 | Morehouse et al. | |
| 4,782,143 | 11/1988 | Morehouse et al. | |
| 4,942,043 | 7/1990 | Sander | |
| 4,960,605 | 10/1990 | Trecker et al. | 426/582 |

*Primary Examiner*—Joseph Golian
*Attorney, Agent, or Firm*—Haugen and Nikolai

[57] ABSTRACT

Essentially dust-free powdered anti-caking agent for foodstuffs is produced by agglomerating particulate material in an airborne fraction of suspended powdered cellulose dust associated with the agitation of powdered cellulose in an enclosed space by contacting the airborne fraction of suspended powdered cellulose particles with a finely divided spray of a dilute aqueous solution of low viscosity cellulose gum and mixing to uniformity.

8 Claims, No Drawings

LOW DUST POWDERED CELLULOSE

BACKGROUND OF THE INVENTION

I. Field of the Invention

The present invention is directed generally to improvements in powdered materials used as anti-caking agents in packaged, processed food products and, more particularly, to a process to reduce and minimize dust associated with the preparation and use of powdered cellulose as an anti-caking agent for shredded and grated cheese.

II. Related Art

Powdered materials, particularly cellulose products, are known to be used as anti-caking agents in the processed food industry, more particularly with respect to incorporation as a surface coating for maintaining separation of packaged, moist shredded and grated cheese products during the shelf life of these products. In use, the powdered cellulose is normally metered or sifted into a mixing chamber for blending with the cheese. The powdered cellulose is finely divided and produces airborne dust which also tends to fill the headspace and even to drift throughout and even out of the mixing equipment.

Mixing vessels in which the shredded or grated cheese is coated have a mixing chamber characteristically cylindrical in shape and containing a low intensity agitator. The powdered cellulose material is added in a finely divided, fluidized form like finely ground flour, or the like, and is easily airborne so the headspace above the material being mixed typically fills with an airborne suspension of cellulose dust. Depending on a number of variables, the process volume, mixing intensity, use level, etc., the dust from the powdered cellulose can create breathing problems for equipment operators, cleaning and sanitization problems on the other equipment in the processing area and problems getting adequate sealing of the grated cheese packages.

The powdered cellulose material itself, however, has very desirable properties with respect to the processed food and has been found to be a superior anti-caking agent as it does not otherwise interfere with consumption, taste or use of the cheese products it coats. Thus, if the dust problem associated with the process of applying the powdered cellulose to the cheese product could be solved, the other advantages associated with the use of the material would be greatly benefitted.

Accordingly, it is a primary object of the present invention to reduce or minimize the dust associated with applying powdered anti-caking agents, particularly powdered cellulose, to divided (shredded, etc.), packaged food products, particularly shredded and grated cheese.

Yet another object of the invention is to provide a method of reducing airborne cellulose powder dust in an anti-caking agent in a manner which does not interfere with the normal subsequent blending process.

Another object of the invention is to provide an essentially dust-free powdered cellulose anti-caking material.

A further object of the invention is to use a dilute spray of an agglomerating agent which does not later affect the food being processed to produce an essentially dust-free cellulose powder for use as an anti-caking agent in a mixing process.

SUMMARY OF THE INVENTION

In accordance with the present invention, the problems associated with airborne powdered cellulose dust in processes for adding powdered cellulose as an anti-caking agent to divided, packaged foodstuffs are solved by the provision of a composition and method for producing an essentially dust-free powdered cellulose anti-caking agent. This invention is particularly applicable to subsequent use of anti-caking agents in mixing vessels which blend shredded or grated cheese products with a powdered anti-caking agent such as powdered cellulose.

In accordance with the invention, a dilute solution of low viscosity agglomerating material is sprayed or atomized into the headspace above the powdered anti-caking agent material which is being agitated in a blender or mixing vessel. The preferred agglomerating material is cellulose gum contained in a dilute aqueous suspension in the range of about 1% to 10% total solids. The method involves spraying amounts of the dilute aqueous suspension into the headspace of the mixer at the beginning of the agitation cycle after the mixer is charged with the powdered anti-caking agent, preferably powdered cellulose. After the blending or mixing chamber is closed and the agitation started, the low viscosity liquid dust agglomerating material is sprayed, preferably atomized, into the headspace which has quickly filled with dust particles to become a dilute phase of suspended powdered cellulose particles. The water/cellulose gum spray droplets are soon coated with powdered cellulose particles. The water is absorbed by the cellulose powder and the cellulose gum functions as a binder for the powdered cellulose. The water spray added is preferably less than about 5% of the weight of the powdered cellulose in the batch; an amount such that it still produces a dust-free and easily utilized material.

The water spray addition is normally completed in a few minutes, usually approximately two minutes, and mixing is thereafter continued until the system is uniform as dictated by the food processing steps. The percentage of cellulose gum in the agglomeration spray, of course, can be adjusted to optimize the results.

Once the powdered cellulose has reached a substantially uniform dust-free state, it is in condition to be utilized by food processors as an anti-caking agent. At this point, the material may be packaged and sold to primary food processors or the process may, of course, be utilized by the food processors themselves as part of a larger overall food production process. In use, the dust-free cellulose material is typically sifted or applied onto the surface of the shredded or grated cheese or other processed foodstuff in low-intensity agitation equipment and the material mixed until coating is satisfactorily completed without the creation of cellulose dust. In this manner, the packaging operation can proceed with the cheese being thereafter weighed and placed in plastic pouches or the like and the pouches heat sealed in a relatively dust-free environment.

DETAILED DESCRIPTION

In the course of processing moist packaged foods in the form of subdivided agglomerable materials, such as shredded or grated cheese, or the like, it is necessary to provide anti-caking agents to prevent the material from reagglomerating into an undefined mass during shipment and storage prior to use. Anti-caking agents are normally admixed with the processed product just prior to packaging by mixing the anti-caking agent in finely divided powdered form with the shredded or grated cheese or other such food product to be treated. It is the usual case that the anti-caking agents are added to the foodstuff as by being sifted over the foodstuff involved and the material subjected to a low-intensity agitation step to provide a substantially uniform coating of the anti-caking agent. Typically, these products are thereafter packaged into clear polymer bags of predetermined sizes for over-the-counter retail sales in supermarkets, or the like. The anti-caking agents preserve the grated or shredded nature of the material throughout the shelf life of the packaged product until use.

The present invention is applicable to this mixing process which has heretofore produced large amounts of dust associated with the mixing of the finely divided powdered material. Typically, the application of an anti-caking agent to a processed foodstuff such as shredded or grated cheese involves a two-step process. The first step is concerned with preparing the anti-caking agent itself and the second step involves applying the anti-caking agent to the foodstuff just prior to packaging. The present invention is concerned with eliminating dust from both steps by processing the anti-caking agent into a relatively dust-free material. The resulting product is normally sold to customers who add it to shredded or grated cheese or other processed foodstuff in a low-intensity mixer which, by virtue of the invention, is able to operate dust-free. Without benefit of the invention, even the low-intensity mixers tend to generate undesirable clouds of cellulose particulate dust which fills the entire headspace of the low-intensity mixer and may leak out into the surrounding processing plant, causing additional mischief.

The present invention involves agitating the powdered cellulose material itself in a closed vessel to create an immediate dust cloud of the finer divided portion of the material, and thereafter spraying, and preferably atomizing, a dilute solution of a low viscosity agglomerating agent into the dust cloud as it is initially generated to produce agglomeration of the airborne suspended fraction of particulate matter. The agglomerated finer particulate fraction can then be mixed with the less volatile particles to form a uniform, relatively dust-free, anti-caking material. The process does not interfere in any way with the later blending of the particulate matter with the food to be coated with the anti-caking agent.

In the preferred embodiment, the anti-caking agent is a polysaccharide of the empirical formula $(C_6H_{10}O_5)_n$, with the glucose units linked as in cellobiose and commonly known as cellulose which is, of course, the chief constitute of the fiber of plants, cotton being its purest natural form. In any event, this material is entirely compatible with normal foodstuffs and commonly used in the food industry as a stabilizer, thickener and texturizer. The preferred agglomerating agent is cellulose gum which is prepared in the form of a dilute, low viscosity suspension containing solids in the preferred range of 1% to 10% total solids by weight.

The dust eliminating process step takes place in a generally cylindrical closed blender which is charged with the desired amount of powdered cellulose anti-caking agent. The blender is also equipped with a system to spray liquid into the headspace of the blender during processing/mixing. The blender is closed after loading with powdered cellulose and the mixing is begun. As soon as the blender is turned on and the mixing starts, dust billows and the headspace volume fills with a dilute phase of suspended powdered cellulose particles.

An amount of the prepared diluted suspension of low viscosity cellulose gum is sprayed into the headspace of the blender or mixer during the beginning phase of the mixing cycle. The mixer employs a number of spray heads so that the water/cellulose gum spray droplets may be sprayed and preferably atomized throughout the headspace as a finely divided droplet spray and become coated with the powdered cellulose particles. The water is then absorbed by the cellulose powder and the cellulose gum further functions as a binder for the powdered cellulose, thereby agglomerating the dust produced initially by the mixing.

Accordingly, it has been found that a water spray of less than about 5% by weight of the total powdered cellulose is sufficient to prevent generation of headspace dust in accordance with the mixing of shredded or grated cheese. The water spray addition is normally completed in approximately the first part of the cellulose agitation process, usually in about the first two minutes, and the mixing is continued until the water is absorbed by the anti-caking agent and it becomes once again a finely divided, but relatively dust-free, material.

The process step yields a substantially dust-free cellulose particulate material highly desirable as an anti-caking agent. The dust-free cellulose material so prepared is itself normally packaged and marketed as an article of commerce to the food processing industry, particularly manufacturers of grated and shredded cheese. Of course, the process may be used as part of an overall food preparation process in which the dust-free cellulose anti-caking agent is both produced and utilized.

In use, substantially dust-free powdered cellulose material is sifted onto or otherwise applied to the surface of a mass of shredded or grated cheese material which is thereafter subject to a low-intensity mixing operation to completely coat the surface of the material with the anti-caking agent prior to packaging. The coated shredded or grated cheese material is then weighed and packaged, normally using transparent, heat-sealed plastic pouches commonly seen in retail establishments.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

I claim:

1. The method of producing low dust powdered cellulose anti-caking agent comprising the step of agglomerating particulate material in an airborne fraction of suspended powdered cellulose dust associated with the agitation of powdered cellulose in an enclosed space by contacting the airborne fraction of suspended powdered cellulose particles with a finely divided spray of a dilute aqueous solution of low viscosity cellulose gum and mixing the agglomerated material to uniformity, wherein the dilute solution of low viscosity cellulose gun contains from about 1% to about 10% total slides.

2. The method of claim 1 wherein the water spray is $\leq 5\%$ of the weight of the powdered cellulose.

3. The method of claim 1 wherein the spraying is conducted for about two minutes or until the dust settles.

4. A dust-free powdered cellulose anti-caking agent produced by the process of claim 1.

5. A method of treating processed foodstuffs with a powdered cellulose anti-caking agent comprising the step of contacting and blending the foodstuff with an amount of powdered cellulose anti-caking agent, said agent having been rendered dust-free by the method comprising the step of agglomerating particulate material in an airborne fraction of suspended powdered cellulose dust associated with the agitation of powdered cellulose in an enclosed space by contacting the airborne fraction of suspended powdered cellulose particles with a finely divided spray of a dilute aqueous solution of low viscosity cellulose gum wherein the dilute solution of low viscosity cellulose gum contains from about 1% to about 10% total solids.

6. The method of claim 5 wherein the water spray is $\leq 5\%$ of the weight of the powdered cellulose producing the dust phase.

7. The method of claim 5 wherein the spraying is conducted for about two minutes or until the dust settles.

8. The method of claim 6 wherein the processed foodstuff is shredded or grated cheese.

* * * * *

UNITED STATES PATENT AND TRADEMARK OFFICE
CERTIFICATE OF CORRECTION

PATENT NO. : 5,391,382
DATED : February 21, 1995
INVENTOR(S) : Rulon A. Chappell It is certified that error appears in the above-indentified patent and that said Letters Patent is hereby corrected as shown below:

In column 4, line 66, delete "gun" and insert -- gum -- .

Signed and Sealed this

Twenty-ninth Day of August, 1995

Attest:

BRUCE LEHMAN

*Attesting Officer*   *Commissioner of Patents and Trademarks*